Oct. 7, 1930.  O. G. STOLZ  1,777,385
AIR VALVE
Filed March 30, 1928
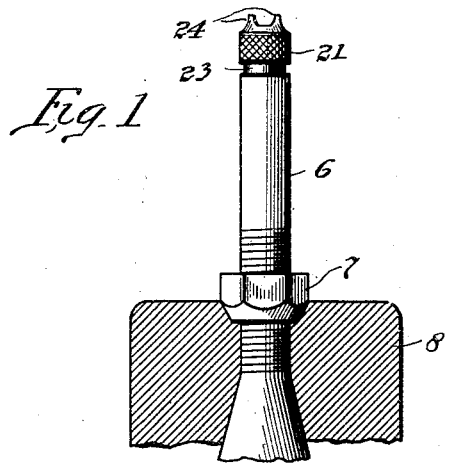
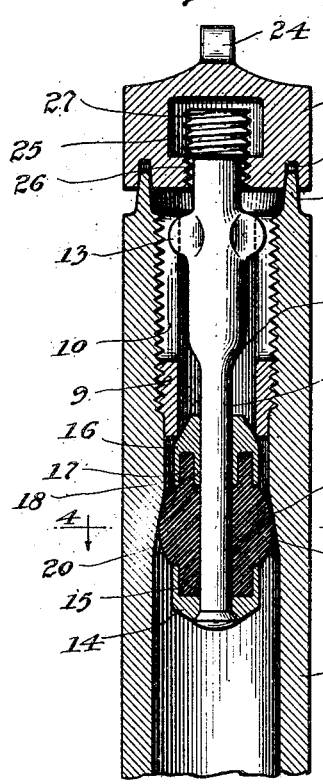
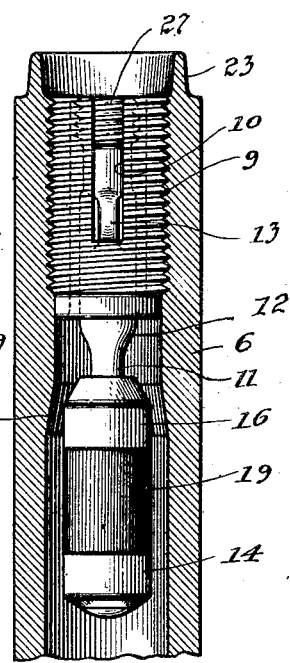
INVENTOR.
Otto G. Stolz
BY Brayton Richards
ATTORNEY.

Patented Oct. 7, 1930

1,777,385

UNITED STATES PATENT OFFICE

OTTO G. STOLZ, OF CHICAGO, ILLINOIS

AIR VALVE

Application filed March 30, 1928. Serial No. 265,964.

The invention relates to improvements in air valves especially adapted for use in the valve stems of automobile tires and the like, the object of the invention being to provide an improved construction of this character which will effect a positive and permanent seal absolutely preventing escape of air from said valve stem.

Another object of the invention is the provision of an air valve of this character which is capable of economical manufacture and quantity production.

Another object of the invention is the provision of an air valve of this character which is durable and efficient in use.

Another object of the invention is to provide an air valve of this character which is capable of operating both as a yieldable check valve to permit of inflation of the tire and also operating as a positively sealing valve.

Other objects will appear hereinafter.

The invention consists in the combinations and arrangements of parts hereinafter described and claimed.

The invention will be best understood by reference to the accompanying drawings forming a part of this specification and in which—
Fig. 1 is a partial sectional view taken through the rim or felloe of an automobile wheel and showing a valve stem equipped with a valve embodying the invention;

Fig. 2, an enlarged detail section of the valve;

Fig. 3, a section taken at right angles to Fig. 2 with the sealing cap removed;

Fig. 4, a section taken substantially on line 4—4 of Fig. 2; and Fig. 5, a bottom plan view of a check valve head employed in the construction.

The preferred form of construction as illustrated in the drawings comprises a valve stem 6 having a central bore for the passage of air, and held in place by a clamping nut 7 on the felloe 8 of a wheel in the usual way. The valve stem 6 is provided at its inner end with means, not shown, for attaching the same to the inner tube of the tire for inflation thereof, as will be readily understood by those skilled in this art.

A sleeve or bushing 9 is threaded in the outer end of the valve stem 6, said sleeve being given an air tight fit in said valve stem so that no air can pass around said sleeve. Diametric slots 10 are provided at opposite sides of the sleeve 9 and extending inwardly from the outer end thereof. A valve rod 11 extends loosely through the sleeve 9, the inner end of said valve rod being reduced from the shoulder 12 which is located substantially opposite the bottoms of the slots 10, said reduction thus facilitating the passage of air through the sleeve, the reduction compensating for the absence of the slots 10, as will be readily understood.

Guide ears 13 are struck from opposite sides of the enlarged portion of the rod 11 to slide loosely in the slots 10, thereby effecting a splined connection between the rod and the sleeve. At its inner end the rod 11 is provided with a stop head 14 having an annular recess 15 immediately surrounding said rod. A valve head 16 is loosely mounted on the rod 11 to seat, as indicated, against the inner end of the sleeve 9. The valve head 16 is provided with an annular groove or recess 17 forming a guide sleeve 18 immediately surrounding the rod 11, thereby facilitating movement of the valve head on said rod.

An expansible rubber packing 19 is placed upon the rod 11 between the valve head 16 and the stop head 14 and the bore of the valve stem 6 opposite the rubber packing 19 is provided with an inwardly flaring conical valve seat 20, as shown, adapted to receive the packing 19 when expanded as indicated in Fig. 2. By this arrangement it will be observed that the valve head 16 is adapted to operate as a check valve permitting entry of air through the valve stem but automatically seating against the inner end of the sleeve 9 under the influence of any outward rush of air. Likewise it is apparent that outward movement of the rod 11 after the head 16 seats upon the sleeve 9 will cause expansion of the rubber packing 19 into tight sealing contact with the valve seat

20 thereby positively and absolutely sealing said valve stem against the passage of air.

The recesses 15 and 17 serve to hold the rubber packing 19 nicely in place and also provide greater volume of rubber in the packing.

The inner guide sleeve 18 in the valve head 16 permits of free sliding of the valve head on the rod 11 in the operation thereof.

The valve rod 11 is manipulated by means of a sealing cap 21 having an annular groove 22 fitting the tapered outer end 23 of the valve stem 6. If desired, the cap 21 may also be provided with ears 24 for engagement with the slots 10 for removal or replacement of the sleeve 9. The cap 21 is also provided with a central bore or recess, the inner portion 25 of which is enlarged as shown and the outer portion 26 is threaded.

The extreme outer end of the rod 11 is provided with an enlarged threaded head 27 fitting the threads 26, the head 27 being, however, of less depth than the enlarged recess 25 as shown in Fig. 2. By this arrangement, when it is desired to inflate the tire, cap 21 is removed and air passed inwardly through the stem 6 in the usual way, the valve head 16 operating as a check valve during such inflation. When the tire is inflated the cap 21 is engaged with the threaded head 27 on the rod 11, as indicated, and said cap turned to the right thereby compressing the rubber packing 19 to expand the same into contact with the valve seat 20 as shown in Fig. 2 and thus effecting a positive air tight seal preventing escape of air from the valve stem 6.

The arrangement is such that when such seal has been effected, the threads on the head 27 run out of the threads 26 thus preventing further tightening and possible injury to the parts. The enlarged recess 25 is made of greater depth than the length of the head 27 so that outward yielding of the rod 11 is still possible and thus the effect of the confined air is utilized for holding the valve 16 and packing 19 to their seats.

Additional sealing effect is afforded by the groove 22 and the tapered end 23. Obviously, in case of leakage a slight tap upon the cap 21 will cause the tapered end 23 to seal in the groove 22 preventing such leakage.

While I have illustrated and described the preferred form of construction for carrying my invention into effect, this is capable of variation and modification without departing from the spirit of the same. I therefore do not wish to be limited to the precise details set forth but desire to avail myself of such variations and modifications as fall within the scope of the appended claims.

I claim:

1. The combination with a valve stem having a central bore of a rod extending into said bore; an enlarged threaded head on the outer end of said rod; a valve connected with said rod for sealing the bore of said stem; and a cap seated on the end of said stem and having a central recess, the inner portion of which is enlarged sufficiently to permit free rotation of said head therein and the outer portion threaded to receive the threads of said head.

2. The combination with a valve stem having a central bore of a rod extending into said bore; an enlarged threaded head on the outer end of said rod; a valve connected with said rod for sealing the bore of said stem; and a cap seated on the end of said stem and having a central recess, the inner portion of which is enlarged sufficiently to permit free rotation of said head therein and the outer portion threaded to receive the threads of said head, said cap having an annular groove and the end of said stem being tapered to fit said groove.

3. The combination with a valve stem having a central bore of a rod extending into said bore; a valve connected with said rod for sealing the bore of said stem; a cap seated on the end of said stem; an operative connection between said cap and said rod whereby sealing force may be applied by said cap to said valve; and a means in said connection for preventing undue application of sealing force to said valve.

In witness that I claim the foregoing as my invention, I affix my signature this 27th day of March, A. D. 1928.

OTTO G. STOLZ.